United States Patent [19]

Weyer

[11] Patent Number: 4,691,582

[45] Date of Patent: Sep. 8, 1987

[54] THIN PROFILE ROTARY ACTUATOR WITH BACKLASH ELIMINATION

[76] Inventor: Paul P. Weyer, 48811 284th SE., Enumclaw, Wash. 98022

[21] Appl. No.: 803,954

[22] Filed: Dec. 2, 1985

Related U.S. Application Data

[63] Continuation-in-part of Ser. No. 575,228, Jan. 30, 1984, Pat. No. 4,590,816, and Ser. No. 692,293, Jan. 17, 1985, Pat. No. 4,683,767.

[51] Int. Cl.$^4$ .......................... F16H 55/18; F16H 1/18
[52] U.S. Cl. ................................. 74/409; 74/424.8 A; 74/424.8 NA; 74/441
[58] Field of Search ................ 74/424.8 NA, 424.8 A, 74/424.8 R, 89.15, 441, 409; 92/31

[56] References Cited

U.S. PATENT DOCUMENTS

| | | |
|---|---|---|
| 2,067,357 | 1/1937 | Terry . |
| 2,791,128 | 5/1957 | Geyer et al. . |
| 2,945,387 | 7/1960 | Geyer .................... 74/441 |
| 2,959,064 | 11/1960 | Geyer et al. . |
| 3,020,775 | 2/1962 | Musser . |
| 3,187,592 | 6/1965 | Geyer . |
| 3,255,806 | 6/1966 | Meyer et al. . |
| 3,333,483 | 8/1967 | Maci et al. ............... 74/424.8 R |
| 3,577,796 | 5/1971 | Eissfeldt ................. 74/424.8 R |
| 3,595,094 | 7/1971 | Lemor et al. . |
| 3,638,507 | 1/1972 | Orner ..................... 74/409 |
| 3,670,583 | 6/1972 | Leming ................... 74/441 |
| 3,847,033 | 11/1974 | Toth ....................... 74/441 |
| 4,022,076 | 5/1977 | Metz ....................... 74/424.8 A |
| 4,036,074 | 7/1977 | Bodnar . . |
| 4,196,654 | 4/1980 | Stearns . |
| 4,369,011 | 1/1983 | Ploss ...................... 74/424.8 A |

FOREIGN PATENT DOCUMENTS

| | | |
|---|---|---|
| 2260300 | 6/1974 | Fed. Rep. of Germany . |
| 2803459 | 8/1979 | Fed. Rep. of Germany ..... 74/424.8 R |
| 3144306 | 5/1983 | Fed. Rep. of Germany . |
| 406747 | 1/1966 | France . |
| 7701097 | 1/1977 | France . |
| 386809 | 1/1965 | Switzerland . |
| 890440 | 2/1962 | United Kingdom . |
| 1362401 | 8/1974 | United Kingdom . |

OTHER PUBLICATIONS

Moscow Bauman Tech Coll. Week 84/ 20 Issued Jun. 27, 1984, a one pg. publication.
Mechanisms, Linkages, and Mechanical Controls, by Chironis, a 4 pg. publication.

Primary Examiner—Cornelius J. Husar
Assistant Examiner—Peter M. Cuomo
Attorney, Agent, or Firm—Seed and Berry

[57] ABSTRACT

A fluid-powered helical actuator including a body, a rotatable shaft member, first and second independently rotatable sleeves reciprocally mounted within the body, a piston reciprocally mounted in the body to produce axially movement in response to the application of fluid pressure, and torque-transmitting ball races and balls for transmitting torque between the sleeves and the body, and the sleeves and the shaft. An adjustment collar is provided for applying an adjustable and oppositely directed axial force on the first and second sleeves for selective relative axially movement thereof to axially preload the first and second sleeves for simultaneously eliminating backlash in all the ball races. In one embodiment, the collar is replaced with a cam ring. An alternative embodiment utilizes a non-cylindrical body a dimension in a first lateral direction greater than a dimension in a transverse second lateral direction. The ball races for transmitting torque between the sleeve and the body are formed on axially extending portions thereof spaced apart in the first lateral direction. The piston head has a similarly non-cylindrical shape. As such, a thin profile actuator having high torque and a large diameter shaft is provided.

47 Claims, 9 Drawing Figures

THIN PROFILE ROTARY ACTUATOR WITH BACKLASH ELIMINATION

CROSS/REFERENCE TO RELATED APPLICATIONS

This is a continuation-in-part of application Ser. No. 575,228, filed Jan. 30, 1984, now U.S. Pat. No. 4,590,816, and application Ser. No. 692,293, filed Jan. 17, 1985, now U.S. Pat. No. 4,683,767.

TECHNICAL FIELD

The present invention relates generally to actuators, and more particularly, to fluid-powered actuators of the type in which axial movement of a piston produces relative movement between a body and an output member.

BACKGROUND ART

Rotary helically splined actuators have been employed in the past to achieve the advantages of high-torque output from a simple linear piston-and-cylinder drive arrangement. The actuators typically employed a cylindrical body with an elongated rotary output shaft extending from end to end coaxially within the body, with an end portion of the shaft providing the drive output. Disposed between the body and the shaft is a piston sleeve splined to cooperate with corresponding splines on the body interior and the output shaft exterior. As an alternative to forming splines on the interior wall of the body, a separate ring gear attached to the body and encircling the sleeve may be used. The piston is reciprocally mounted within the body and has a head for the application of fluid pressure to one or the other opposing sides thereof to produce axial movement of the piston. The sleeve is elongated and coaxially receives the shaft therein.

As the piston linearly reciprocates in an axial direction within the body, the outer splines of the sleeve engage the splines of the body or ring gear to cause rotation of the sleeve. The resulting linear and rotational movement of the sleeve is transmitted through the inner splines of the sleeve to the splines of the shaft to cause the shaft to rotate. Bearings are typically supplied to rotatably support one or both ends of the shaft relative to the body.

With such an arrangement, as the piston reciprocally moves from one axial direction to the other to produce relative rotational movement between the body and the shaft in response to application of fluid pressure to the piston head, backlash results from the slack existing between the intermeshing splines of the piston sleeve and the body and the intermeshing splines of the piston sleeve and the shaft. While accurate machining of the splines will reduce the backlash problem, this procedure substantially increases the manufacturing cost. Even with accurate machining, conventional machining techniques are virtually incapable of totally eliminating the slack which produces the backlash problem. Furthermore, to the extent more accurate tolerances produce actuator parts which fit tightly together and reduce slack, assembly of the actuator becomes difficult. While accurate machining reduces slack initially, should the splined parts wear during usage or otherwise lose their original tolerances, no means exist for elimination of the slack that develops without disassembly of the actuator and possible remachining or replacement of the splined parts.

It is desirable that the fluid-powered rotary actuator should not require exceptionally accurate machining of the torque-transmitting parts to eliminate slack that produces backlash, and that the actuator should be easy to assemble. To facilitate assembly, the design of an actuator must incorporate a certain amount of slack, but the slack results in undesirable backlash during operation. Means should be provided for substantially complete elimination of the slack causing the backlash problem after the actuator is assembled. Even though accurate machining reduces slack initially, should the torque-transmitting parts wear during usage or otherwise lose their original tolerances, means should be provided for elimination of any slack that develops. Elimination of the slack should be accomplished in a simple manner without requiring disassembly of the torque-transmitting parts from the body, and with an adjustment which simultaneously removes the slack existing between all of the torque-transmitting parts within the body which translate linear movement of the piston into rotational movement of the output member. The actuator should be usable with torque-transmitting means other than splines to avoid the undesirably high frictional coefficient of splines.

While actuators have been constructed using balls and helical ball races, and provide a higher output efficiency due to the rolling friction of the balls being less than the sliding friction of the splines, conventional helical ball screw actuators require recirculation of the balls as the ball carrier reciprocally moves within the actuator cylinder. The recirculation allows the balls to roll relatively unrestricted within the ball races to avoid the balls scuffing along the races. While the use of recirculation eliminates most of the ball scuffing problem, it is difficult and expensive to manufacture an actuator with a recirculation path; and no recirculation path can provide a totally unrestricted flow of the balls. Additionally, to accommodate the recirculation path, the actuator must be made with a larger diameter than ordinarily necessary since recirculation requires that the recirculation path double back over the ball races carrying the balls.

When used in certain applications, such as for an aircraft flight control actuator, precision, weight and thickness becomes critical, while at the same time a high torque is required. When used as the power means to rotate an aircraft flight control surface, particularly with high performance aircraft, the forces encountered by the control surfaces are large, and accurate positioning and fast movement of the control surfaces is necessary due to the extreme responsiveness of the aircraft to control surface movement and to the high aircraft flight speeds. Also, since minimum turbulence is tolerable, it is desirable to use no external hinges or levers. Weight limitations are severe and space availability is limited. Every pound of weight has a negative impact on the flight performance of the aircraft, and little space is available to position actuators within the aircraft adjacent to the control surfaces. This is particularly a problem with current designs for thin wing aircraft where the interior space adjacent to the wing control surface, within which the actuator must fit, may be no larger than five inches in height and taper downward somewhat in the direction of the control surface. While a small diameter actuator is required to fit within the space available, high output torque and a large diameter shaft to handle the high torque are required.

If a conventional actuator is used having sufficient torque output and shaft size to handle the torque, it will be too thick to fit within the space available. If a small diameter conventional actuator is used, it will have insufficient torque or shaft size. Moreover, the weight of a conventional actuator would be too great. Another disadvantage of conventional actuators is the backlash realized. The backlash results in control surface flutter and inaccurate control of the control surface. Fluid leakage problems are also encountered with conventional actuators.

It is desirable to provide an actuator that avoids these problems, and that provides the benefits noted above. The present invention fulfills these needs and further provides other related advantage.

DISCLOSURE OF INVENTION

The present invention resides in a fluid-powered actuator having a body, a rotatable member supported for rotation relative to the body and connectable to an external device, first and second coaxial members reciprocally mounted within the body, and at least one piston reciprocally mounted within the body for application of fluid pressure to one or the other opposing sides thereof to produce axial movement of the piston. The piston operatively engages at least one or the other of the first and second members to axially move the members in response to axial movement of the piston. The first and second members are independently rotatable.

The actuator further includes first torque-transmitting means for transmitting torque between the first member and the body, second torque-transmitting means for transmitting torque between the first member and the rotatable member, third torque-transmitting means for transmitting torque between the second member and the rotatable member, and fourth torque-transmitting means for transmitting torque between the second member and the body. At least the first and fourth torque-transmitting means or the second and third torque-transmitting means produce relative rotational movement between the body and the rotatable member in response to axial movement of the reciprocating piston during fluid-powered operation.

The actuator also has a collar threadably attached to the first member for applying an adjustable and oppositely directed axial force on the first and second members for selective relative axial movement thereof. The force axially preloads the first and second members for substantially eliminating backlash in the first, second and third and fourth torque-transmitting means as the piston moves from one axial direction to the other during reciprocation of the piston to produce relative rotational movement between the body and the rotatable member in response to selective application of fluid pressure to the piston. As such, backlash resulting from slack in the first, second, third and fourth torque-transmitting means can be avoided by adjustment prior to fluid powered operation of the actuator.

In a first embodiment of the invention, the collar is coaxially threaded to an axially outward end portion of the first member. The actuator further includes at least one engagement member axially extending between and engaging each of the collar and the second member to apply the axial force on the first and second members as the collar is adjusted. In a preferred embodiment, the engagement member is a pusher pin positioned to apply an axially outward force on each of the first and second members for separation thereof in the axial direction in response to rotational adjustment of the collar relative to the first member to move the collar toward the second member.

The pin is slidably disposed in a pair of axially extending and substantially straight grooves. One of the grooves is formed in the outward side of the first member and the other of the grooves is formed in the inward side of the body. The pin grooves are confronting and corresponding to each other and sized to slidably receive the pin therein. The first and fourth torque-transmitting means includes a plurality of substantially straight pairs of confronting and corresponding ball races forming sets of races between the first member and the body, and between the second member and the body with at least one ball seated in each of the ball races for transmitting torque. The pin groove in the body is positioned between two adjacent ball races in the body forming part of the first torque-transmitting means and is radially positioned no further outward than the adjacent body ball races.

A bearing member is positioned between the first and second members and the pins slidably engage the bearing member and applies the axially outward force on the second member through the bearing member. The actuator further includes means for selectively locking the collar against rotation relative to the first member during usage of the actuator.

In an alternative embodiment of the invention, the collar is coaxially threaded to an axially inward end portion of the first member and projects axially inward and slidably engages the second member. In this embodiment, the collar is externally adjustable with a tool which engages projections formed on the perimeter of the collar for adjusable rotation of the collar. The body has a sealable adjustment port located for access to the collar projections with a tool. A generally axially oriented lock member retained against rotation relative to one of the first or second members is provided. The lock member is selectively positionable between adjacent projections of the collar to lock the collar against rotation relative to the first and second members during usage of the actuator.

In another alternative embodiment of the invention, the second member is provided with an axially inward cam face. Instead of an adjustment collar, the actuator is provided with a cam ring positioned within the body generally coaxial with and between the first and second members. The cam ring has a cam face confronting and corresponding to and operatively engaging the cam face of the second member. The cam ring further has an opposite face slidably engaging the first member. The cam ring is rotatable to cause a camming action with the cam face of the second member to thereby apply an adjustable and oppositely directed outward axial force on the first and second members for axially preloading them to eliminate backlash. Lock means is provided to selectively lock the cam ring against rotation relative to the second member during usage of the actuator. Projections are provided on the perimeter of the cam ring for rotatable adjustment using a tool.

In one embodiment of the invention, the body has a non-cylindrical sidewall with a dimension in a first lateral direction greater than a dimension in the transverse second lateral direction. The body sidewall has first and second axially extending interior sidewall portions spaced apart in the first lateral direction.

The piston has a non-cylindrical sleeve with a dimension in the first lateral direction greater than a direction in the second lateral direction. The sleeve has first and second axially extending exterior sidewall portions spaced apart in the first lateral direction and confronting the first and second body interior sidewall portions. With this design, high torque relative rotational movement between the body and shaft is produced in response to selective application of fluid pressure of the piston head with a body having a thin profile in the second lateral direction.

In one embodiment the first and second body interior sidewall portions comprise an integral part of the body sidewall, while in another a pair of spaced apart inserts is positioned within the body and have the body grooves formed on an interior facing side thereof. Means are also provided for preventing rotation of the inserts within the body during usage of the actuator.

The body sidewall has axially extending smooth interior sidewall portions spaced apart in the second lateral direction. The sleeve similarly has axial extending smooth exterior sidewall portions spaced apart in the second lateral direction confronting and corresponding to the smooth body interior sidewall portions. The first torque-transmitting means sufficiently limits lateral movement of the sleeve in the second lateral direction to hold the smooth sleeve exterior sidewall portions from engaging the smooth body interior sidewall portions during fluid powered operation of the actuator.

The body and sleeve grooves of the first torque transmitting means comprise straight ball races positioned in confronting and corresponding relationship to form ball channels. The first torque-transmitting means further includes one or more balls seated in each of the ball channels. The second torque-transmitting means includes helical ball races formed on the sleeve and the shaft in confronting and corresponding relationship to form ball channels, and one or more balls seated in each of the ball channels.

The piston head is also non-cylindrical in this one embodiment with a dimension in the first lateral direction greater than a direction in the transverse second lateral direction. As such, the pressurized surface area of the head is increased by extending the head in the first lateral direction to increase the torque output of the actuator without increasing the thickness of the actuator in the critical second lateral direction.

BEST MODE FOR CARRYING OUT THE INVENTION

Figures 1, 2, 7:
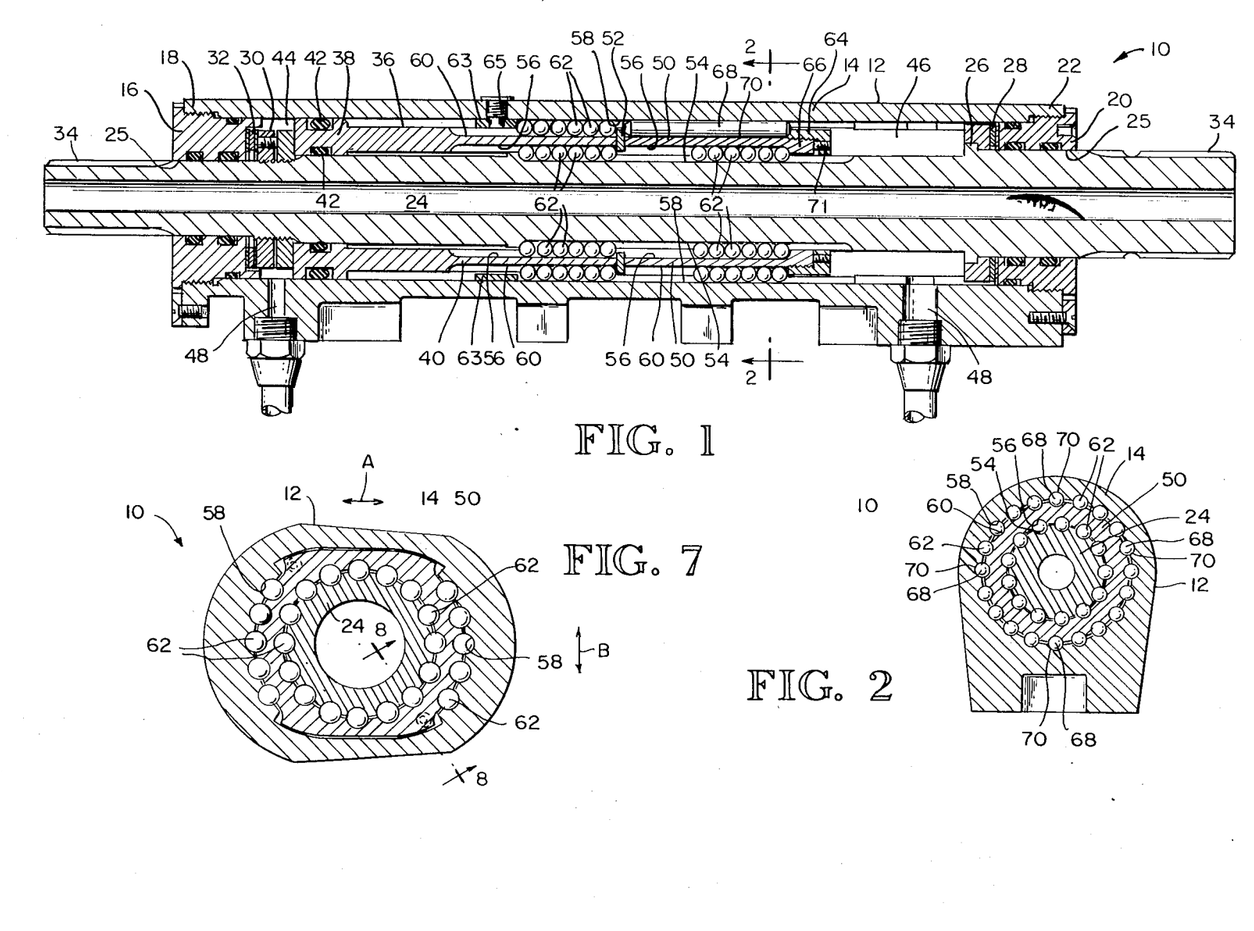
FIG. 1 is a side elevational, sectional view of a fluid-powered helical ball screw actuator embodying the present invention.
FIG. 2 is a sectional view taken substantially along the lines 2—2 of FIG. 1.
FIG. 7 is a sectional view similar to the view of FIG. 6 except for an alternative embodiment using ball races formed directly on the sidewall.

As shown in the drawings for purposes of illustration, the present invention is embodied in a fluid-powered rotary actuator, indicated generally by reference numeral 10. A first embodiment of the invention is shown in FIGS. 1 and 2. In this embodiment, the actuator 10 includes an elongated housing or body 12 having a cylindrical sidewall 14. A first end cap 16 is threadably attached to the body 12 at a first end 18 and a second end cap 20 is threadably attached to the body at a second end 22. A rotary output shaft 24 is coaxially positioned within the body 12 and supported for rotation relative to the body. The shaft 24 has a hollow center to reduce weight. The ends of the shaft 24 extend through a central aperture 25 in each of the caps 16 and 20. Conventional seals are provided to prevent fluid leakage.

The shaft 24 has a radially outward extending flange portion 26 positioned toward the second end 22 and rotatably held in place against outward thrust by an annular thrust bearing 28. The thrust bearing 28 is disposed between the flange portion 26 and the second end cap 20. Threadedly attached to the shaft 24 toward the first end 18 is a lockable nut 30. The nut 30 is positioned inward of the first end cap 16 and is rotatably held in place against outward thrust by an annular thrust bearing 32. The thrust bearing 32 is disposed between the nut and first end cap.

The portions of the shaft 24 extending outward through the apertures 25 in the caps 16 and 20 and therebeyond have a splined portion 34 for coupling to an external device (not shown). The body 12 is adapted for attachment to a stationary support frame (not shown).

The invention may be practiced with the shaft 24 rotatably driving the external device, or with the shaft being held stationary and the rotational drive being provided by rotation of the body 12. While the present embodiment has a splined portion 34 at each end of the shaft 24, the shaft may extend from just one end, or the end of the shaft may be recessed and not extend from the body 12. Other means than splines may be used for attachment of the external device to the shaft.

A piston sleeve 36 is coaxially and reciprocally mounted within the body 12 about the shaft 24. The piston sleeve 36 has a head portion 38 positioned toward the first end 18 of the body 12, and a sleeve portion 40 extending axially inward therefrom. The head portion 38 carries conventional inner and outer seals 42 disposed between the head portion and corresponding smooth wall portions of the shaft 24 and the body sidewall 14 to define fluid-tight compartments 44 and 46 to each side of the head portion.

The smooth interior wall portion of the sidewall 14 and the smooth exterior wall portion of the shaft 24 have sufficient axial length to accommodate the full stroke of the head portion 38 of the piston sleeve 36 within the body 12. Reciprocation of the piston sleeve 36 within the body 12 occurs when hydraulic fluid or air under pressure selectively enters through a pair of ports 48 in the sidewall 14 to each side of the piston sleeve which each communicate with one of the fluid-tight compartments 44 and 46. The application of fluid pressure to the compartment 44 at the axially outward side of the head portion 38 toward the first end 18 produces axial movement of the piston sleeve 36 toward the second end 22. The application of fluid pressure to the compartment 46 at the axially outward side of the head portion 38 toward the second end 22 produces axial movement of the piston sleeve 36 toward the first end 18. The actuator 10 provides relative rotational movement between the body 12 and the shaft 24 through the conversion of linear movement of the piston sleeve 36 into rotational movement of the shaft, as will be described in more detail below.

An annular sleeve 50 is coaxially and reciprocally mounted within the body 12 about the shaft 24 toward the second end 22 of the body 12. Positioned between the axially inward facing wall of the sleeve portion 40 of the piston sleeve 36 and the axially inward facing wall of the sleeve 42 is a bearing ring 52. The sleeve portion 40 and the sleeve 42 are independently rotatable within at least a limited range for backlash adjustment purposes, and are in slidable engagement with each other through the bearing ring 44.

A helical ball race 54 is formed on the shaft 24 confronting and corresponding to a pair of helical ball races 56 formed on the radially inwardly facing wall of each of the sleeve portion 40 and the sleeve 50. The ball races 54 and 56 have substantially identical lead and pitch, and form a pair of laterally confined, variable length inner ball channels defined by the area of coincidence of the corresponding ball races as the piston sleeve moves axially within the body 12.

The sidewall 14 has a straight ball race 58 formed thereon confronting and corresponding to a pair of straight ball races 60 formed on the radially outward facing wall of each of the sleeve portion 40 and the sleeve 50. The ball races 58 and 60 form a pair of outer ball channels.

A plurality of balls 62 are disposed in each of the inner and outer channels for transmission of torque between the sleeve portion 40 of the piston sleeve 36 and the shaft 24, between the sleeve portion and the sidewall 14, between the sleeve 50 and the shaft, and between the sleeve and the sidewall. The bearing ring 52 serves as a ball stop, as do the blocked ends of the ball races and a ball stop ring 63, to engage and limit travel of the balls 62 in the inner and outer channels and to regroup the balls if they do not roll fully back against the stops. The ball races extend over a sufficient axial length to permit the balls to roll freely within the inner and outer channels during the entire piston sleeve travel and avoid scuffing of the balls. The ball stop ring 63 encircles the sleeve portion 40 for engaging the balls 62 in the outer channel, and is held in place by a pin 65 threadably received in a sealed aperture in the sidewall 14. The bearing ring 52, in addition to another function that will be described below, serves to prevent the balls 62 from passing out of one open ball race end and into another. It is to be further understood that while the ball races 54, 56, 58 and 60 comprising the inner and outer channels are described as single channels, they actually comprise a plurality of circumferentially spaced channels.

As the piston sleeve 36 and the sleeve 50 linearly reciprocate between one or the other axial directions within the body 12, any torque applied thereto is transmitted by the balls 62 through the coaction of the ball race 58 on the sidewall 14 with the ball races 60 on the sleeve portion 40 and the sleeve 50. Since the ball races 58 and 60 are straight, the transmitted torque does not cause the piston sleeve 36 or the sleeve 50 to rotate as they move axially, but rather prevents any such rotation.

The resulting linear movement of the piston sleeve 36 and the sleeve 50 transmits torque, by the balls 62, through the coaction of the helical ball races 56 on the sleeve portion 40 and the sleeve 50 with the helical ball race 54 on the shaft 24. The transmitted torque causes the shaft 24 to rotate relative to the body 12 since axial movement of the shaft is restricted by the thrust bearings 28 and 32. As such, axial movement of the piston sleeve 36 is converted into relative rotational movement between the body 12 and the shaft 24. Since the sleeve portion 40 of the piston sleeves 36 and the sleeve 50 are in engagement, the application of fluid pressure to the compartment 44 or 46 to move the piston sleeve will cause the sleeve to move by the same amount, thereby producing simultaneous rotational movement of both the sleeve portion and the sleeve in the same rotational direction.

The actuator 10 is further provided with an adjustment collar 64 coaxially threaded to an axially outward end portion 66 of the sleeve 50. Four axially extending pusher pins 68 are circumferentially spaced about the sleeve 50 and extend between and engage the collar 64 and the bearing ring 52. The pins 68 apply axial outward force on each of the sleeve 50 and the piston sleeve 36 for separation thereof in response to adjustment of the collar relative to the sleeve to move the collar 64 toward the piston sleeve. In such manner, the pins 68 may be adjustably brought to engage the bearing ring 52 and therethrough apply an adjustable and oppositely directed axially outward force on each of the sleeve portion 40 of the piston sleeve 36 and the sleeve 50. The force moves the piston sleeve 36 relative to the sleeve 50 to axially preload the piston sleeve and the sleeve for substantially eliminating backlash as the piston sleeve moves from one axial direction to the other in response to selective application of fluid pressure to the compartments 44 and 46.

The backlash results from the slack or free movement between the torque-transmitting parts. The slack is usually due to the sizing of the ball races forming the inner and outer channels and the balls 62 positioned therein, which transmit torque between the body 12 and the shaft 24 through the piston sleeve 36 and the sleeve 50.

A sealable access port (not shown) is provided for access to the collar 64 for its adjustment without disassembling the piston sleeve 36 or the sleeve 50 from the body 12. Each of the pins 68 is disposed in a pair of axially extending straight grooves 70 in confronting and corresponding relation formed on the radially inward facing wall of the body sidewall 14 and on the sleeve 50. The grooves are sized to slidably receive the pin. The groove 70 formed on the radially inward facing wall of the body sidewall is at the same radial position as the ball races formed thereon for the outer ball channel so as not to require any increase in the diameter of the body 12 to provide for transmission to the piston sleeve of the axial force used for backlash elimination.

In operation, the inward adjustment of the collar 64 to apply axially outward directed force on the piston sleeve 36 and the sleeve 50 operates to eliminate the slack between all of the ball races by causing axial separation of the sleeve portion 40 of the piston sleeve 36 and the sleeve 50. By inward adjustment of the collar 64, through the outward force transmitted by the pins 68, an equal and oppositely directed axially outward force is applied to each of the piston sleeve 36 and the sleeve 50. The outward force moves the piston sleeve 36 axially toward the first end 18 and carries the balls 62 in the inner ball race 56 formed on the sleeve portion 40 of the piston sleeve into firm seated contact with the corresponding ball races 54 formed on the shaft 24. As such, all slack is eliminated therebetween. Simultaneously, the outward force moves the sleeve 50 axially toward the second end 22 and carries the balls 62 in the inner ball race 56 formed on the sleeve into firm seated contact with the ball race 54 formed on the shaft 24. As such, all slack is eliminated therebetween.

The continued inward adjustment of the collar 64 after the slack has been completely eliminated from the inner channel, will cause the piston sleeve 36 and the sleeve 50 to rotate in opposite directions while moving them axially apart until the slack in the outer channel is eliminated. This is because the piston sleeves 36 and the sleeve 50 remain free to rotate relative to each other when the slack in the inner channel has been removed, and the helical inner channel will cause the rotation of the piston sleeves 36 and the sleeve 50 in opposite rotational directions in response to the axially outward force being applied by the collar 64. The rotation will continue and produce axial separation of the piston sleeve 36 and the sleeve 50 until the balls 62 in the outer ball race 60 formed on the sleeve portion 40 of the piston sleeve 36 are carried into firm seated contact with the corresponding ball race 58 formed on the body sidewall 14, and the balls in the outer ball race 60 formed on the sleeve 50 are carried into firm seated contact with the corresponding ball race 58 formed on the body sidewall.

At such time that the piston sleeves 36 and the sleeve 50 have been moved apart by the collar 64 sufficiently to produce enough axial separation to eliminate all slack in the torque transmitting members, a steady state will be reached and all backlash eliminated. The collar 64 can be locked in this position to insure the axial loading is maintained during usage of the actuator by a set screw 71 which prevents rotation of the collar relative to the sleeve.

Upon the application of fluid pressure to one of the fluid-tight compartments 44 and 46 during fluid-powered operation of the actuator 10, the piston sleeve 36 and the sleeve 50 move in unison, with substantially all backlash eliminated as the piston sleeve and the sleeve reciprocate within the body 12. Should usage of the actuator 10 cause wear of the ball races or the balls therein, or should slack occur for any other reason, the slack can be easily removed in the same manner described above by further adjustment of the collar 64 without disassembly of the piston sleeve 36 and sleeve 50 from the body 12.

With the present invention, the ball races may be machined using conventional machining techniques with standard tolerances, and the slack which creates the backlash problem can be eliminated by adjustment prior to fluid-powered operation of the actuator 10. Furthermore, the ball races can be machined with a size to permit easy assembly of the actuator and any slack thereby introduced can be eliminated by adjustment. It is noted that all slack in the inner and outer channels is eliminated simultaneously with one easy external adjustment of the collar 64.

It is to be understood that while the embodiment of the invention just described, as well as all of the embodiments of the invention which will be described hereinafter, show ball races with balls as the form of torque transmission means, the present invention can also be used to eliminate the slack found with splines or roller screw bearings, or other torque-transmitting means. By the use of ball races and balls, the radial load handling characteristics of the actuator are significantly increased, since unlike splines, the balls provide significant support against radial loading in addition to the transmission of torque. Moreover, since rolling balls are used, the hydraulic fluid can have a water-base without lowering the pressure and torque rating of the actuator as would be the situation if the lubricating quality of the fluid for lowering the sliding friction of the splines was decreased.

A second embodiment of the invention is shown in FIGS. 3, 4, 5 and 6, similar in construction to the first embodiment shown in FIGS. 1 and 2, except as will be hereinafter described. For ease of understanding, the components of the second embodiment have been similarly numbered with those of the first embodiment.

Figure 3:
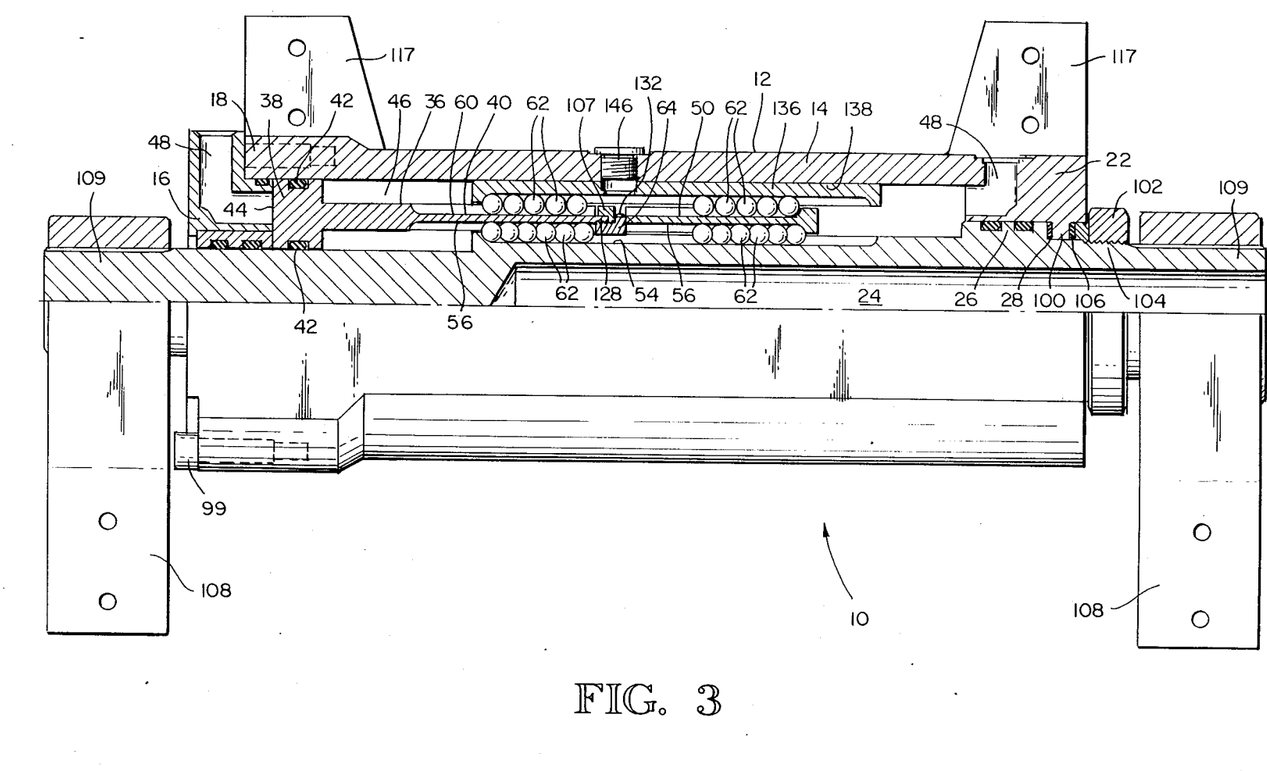
FIG. 3 is a top plan partial, sectional view of a second alternative embodiment of the invention, showing a ball screw actuator with a non-cylindrical body.
Figure 4:
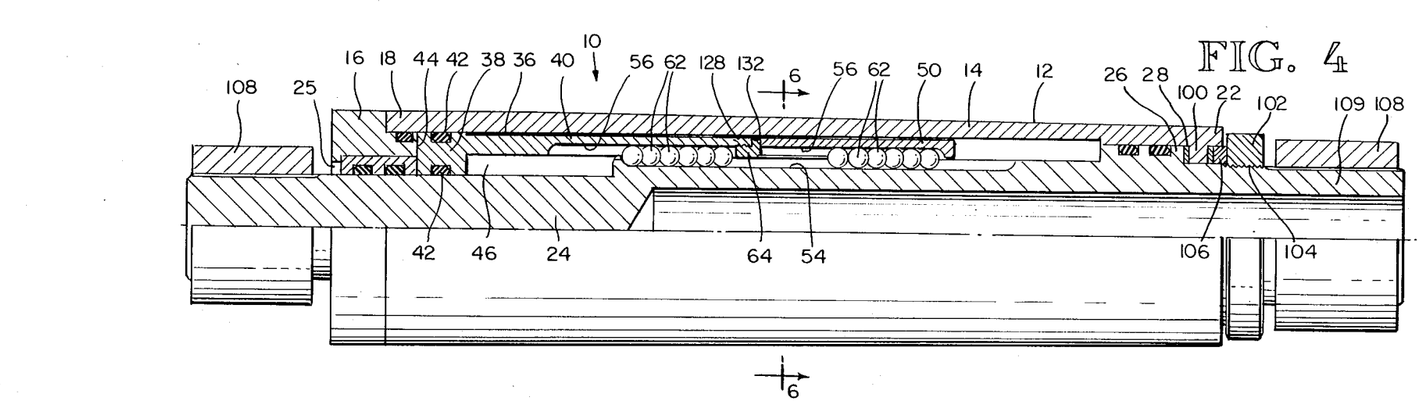
FIG. 4 is a side elevational, partial sectional view of the actuator of FIG. 3.

In the second embodiment, the end cap 20 is eliminated, and the other end cap 16 is attached to the body 12 by a plurality of bolts 99. The shaft thrust bearing 28 is positioned between the shaft flange 26 and a radially inwardly projecting portion 100 of the sidewall 14. A nut 102 is threadably attached to a threaded portion 104 of the shaft 24 positioned outside the body 12 at the second end 22. Disposed between the nut 102 and the sidewall projecting portion 100 is an axial thrust bearing 106 to prevent axial movement of the shaft toward the first end 18. The actuator 10 further includes a ball stop ring 107 positioned between the sleeve portion 40 of the piston sleeve 36 and the sleeve 50 to prevent the travel of balls beyond the ball race open ends.

Figure 5:
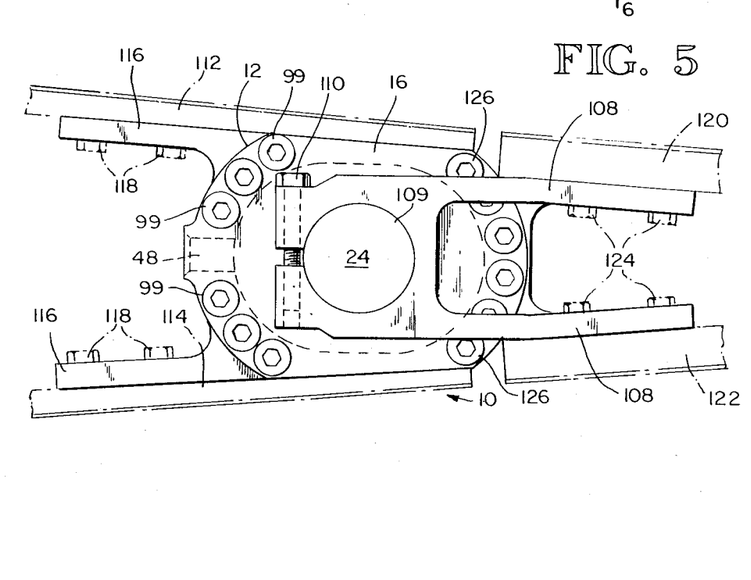
FIG. 5 is a fragmentary end view of the actuator of FIG. 3, showing the actuator positioned within a wing and attached to an aircraft flight control surface.

An attachment fork 108 is attached at each end of the shaft 24 to a shaft end portion 109 extending outward beyond the body 12. As best shown in FIG. 5, the fork is clamped to the shaft end portion by tightening of a clamping bolt 110. In FIG. 5, the actuator 10 is shown positioned within the interior space between an upper surface portion 112 and a lower surface portion 114 of an aircraft wing (shown in phantom). Mounting tabs 116 are rigidly connected to the body 12 of the actuator 10 and are used to hold the actuator in place within the wing using fasteners 118. It is noted that the interior space within which the actuator 10 must fit is at a very narrow trailing portion of the wing, and that the upper and lower wing surface portions 112 and 114 taper toward each other in the aft direction.

The attachment fork 118 is shown in FIG. 5 projecting between an upper surface portion 120 and a lower surface portion 122 of a wing flap (shown in phantom). The flap is attached to the fork by fasteners 124, and is rotated up and down by rotation of the shaft 124 of the actuator 10. It is noted that the actuator 10, and the means of attachment of the actuator to the wing and wing flap are entirely within the wing and wing flap and not exposed to air currents which could increase the drag and adversely affect the flight performance of the aircraft.

In the second embodiment of the invention, the collar 64 is coaxially threaded to a threaded axially inward end portion 128 of the sleeve portion 40 of the piston sleeve 36. The collar projects axially inward toward and slidably engages the axially inward facing end wall of the sleeve 50. In much the same manner as described above, but without the use of pusher pins 68, the collar 64 is adjustably rotatable to exert an axially outward force on each of the piston sleeve 36 and the sleeve 50 to eliminate slack.

Because of the central location of the collar 64 in this embodiment, it is necessary to provide a sealable access aperture 130 (see FIG. 6) in the body sidewall 14 to gain access to the collar for its adjustment without disassembly of the actuator. The collar 64 has circumferentially spaced apart projecting portions 132 formed on the perimeter thereof sized and shaped for engagement with a tool (not shown) used to rotationally adjust the collar. With the actuator fully assembled, the collar projections can be reached with the tool through the access aperture 130. Somewhat in the manner of a ratchet, the tool is used to rotate the collar 64 relative to the piston sleeve 36 for its extension to apply the axial force needed to eliminate backlash.

Figure 8:
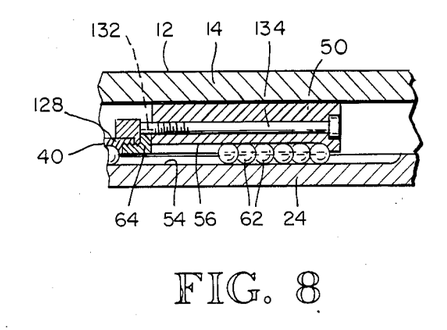
FIG. 8 is a fragmentary, sectional view taken substantially along the lines 8—8 of FIG. 6.

Once all backlash has been eliminated, it is desirable to lock the collar against rotation relative to the piston sleeve 36 and the sleeve 50 during usage of the actuator. To do so, a pair of lock screws 134 are received in threaded apertures extending axially through the sleeve 50 as shown in FIG. 8. The lock screws 134 may be screwed inward to project from the axially inward facing end of the sleeve 50 and between a pair of adjacent collar projections 132 so as to retain the collar 64 against rotation relative to the sleeve 50, and hence the piston sleeve 36, during usage of the actuator 10.

Figure 6:
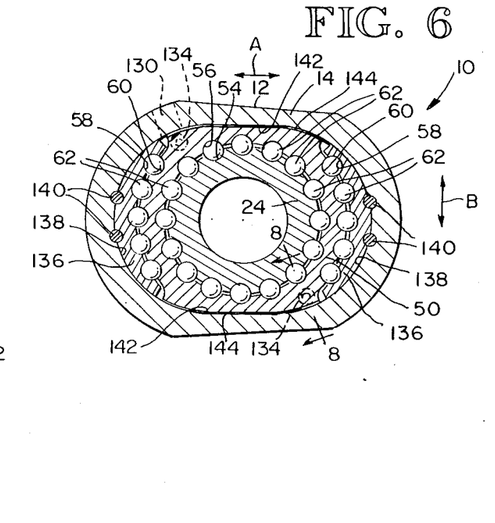
FIG. 6 is a sectional view taken substantially along the lines 6—6 of FIG. 4.

In the second embodiment of the invention, as shown in FIGS. 4-6, to provide for a thin profile actuator which has a high torque output and a large diameter torque-transmitting shaft with strength sufficient to handle the torque, the body sidewall 14 has a non-cylindrical, generally oval cross-sectional shape. The sidewall 14 has a dimension in a first lateral direction, indicated by the double headed arrow "A", greater than a dimension in a transverse second lateral direction, indicated by the double headed arrow "B" (see FIG. 6).

The head portion 38 and sleeve portion 40 of the piston sleeve 36 and also the sleeve 50 are similarly oval shaped, with a size in the first lateral direction A exceeding the size in the transverse second lateral direction B. No outer ball channels are provided along two axially extending and opposing wall portions 142 and 144 of the sidewall 14 which are spaced apart in the second lateral direction B. As such, the size or thickness of the actuator in the second lateral direction B is significantly reduced.

To compensate for the fact that the head portion 38 of the piston sleeve 36 is reduced in size in the second lateral direction B, and hence the area of the pressure bearing surface of the head portion is reduced, the head portion is provided with increased size in the first lateral direction A. Since the horizontal space limitations for aircraft wings is not as severe as the height limitations, the present invention provides an actuator with the thin height profile necessary to fit within the wings of even high performance aircraft using thin wing designs. Although the size of the actuator is increased in the first lateral direction A, it is still within an acceptable size and produces the needed torque to operate high performance aircraft control surfaces. The actuator has a high operating fluid pressure and high torque output with a minimum height in the critical second lateral direction B and a maximum shaft diameter to handle the torque.

In the embodiment of the actuator shown in FIGS. 3-6, the straight body ball races 58 of the outer channel are formed on a pair of axially extending, elongated inserts 136. The inserts 136 have an arcuate shape and are positioned within the body 12 adjacent to two axially extending interior sidewall portions 138 of the sidewall 14 which are spaced apart in the first lateral direction A. Each of the inserts 136 is retained within the body 12 against rotation during usage of the actuator 10 by a pair of axially extending lock pins 140. The lock pins 140 are received in two pairs of confronting and corresponding grooves formed in the sidewall 14 and the radially outward face of the insert. A pair of threaded lock pins 146 extend through sealed apertures in the body sidewall 14 and each engages one of the inserts 136 and holds it against axial movement within the body 12. The inserts 136 are manufactured of hardened steel, and as such, the body sidewall 14 may be made of a light material such as titanium or aluminum. This provides a reduce weight actuator with only the inserts 136 in which the ball races 58 are formed being made of the heavier steel.

The ball races 60 formed on the outwardly facing surface of the sleeve 50, which correspond to the ball races 58 in the inserts 136, are also formed only along two axially extending portions of the sleeve spaced apart in the first lateral direction A. As noted above, the design of the actuator eliminates the ball races in the second lateral direction B. This reduces the diameter of the actuator 10 in the critical second lateral direction since there are no ball races which require thicker walls for the body and the sleeve so as to have sufficient strength and thickness to permit cutting of the races, and which must be of sufficiently large size to receive the torque-transmitting balls.

As with the body sidewall 14 the sleeve portion 38 and the sleeve 50 each have two axially extending smooth exterior sidewall portions 144 spaced apart in the second lateral direction. The smooth sleeve exterior sidewall portions 144 confront and correspond to the smooth body interior sidewall portions 142 of the sidewall 14, and are in close proximity therewith to minimize any unnecessary spacing which would increase the diameter of the actuator in the second lateral direction B. The operation of the straight outer channels formed by the ball races 58 and 60 sufficiently limit lateral movement of the sleeve 50 in the second lateral direction B to prevent the smooth sleeve exterior sidewall portions 144 from engaging the smooth body interior sidewall portions 142 and applying force on the thinner body sidewall portions during fluid powered operation of the actuator.

An alternative manner of constructing the actuator shown in FIGS. 3-6 is shown in FIG. 7. The races 58 which are part of the outer channels are formed directly in the body sidewall 14. Otherwise, the actuator is identical in construction to the actuator just described.

Figure 9:
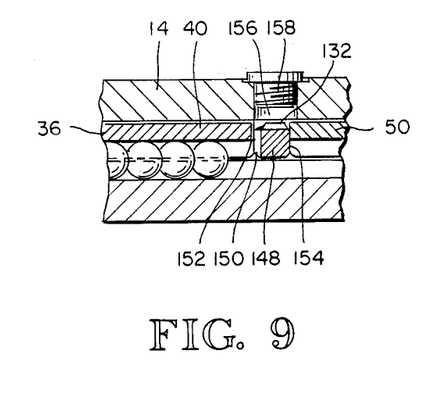
FIG. 9 is a fragmentary, side elevational view of an alterntive embodiment for the adjustment collar, using a cam ring.

An alternative construction is shown in FIG. 9 to the use of the collar 64 for providing the axially outward force on the piston sleeve 36 and the sleeve 50 for elimination of backlash. As with the collar in the embodiment shown in FIG. 3, a cam ring 148 is positioned within the body 12 generally coaxial with and between the sleeve portion 40 of the piston sleeve 36 and the sleeve 50. The cam ring 148 has a cam face 50 confronting and corresponding to a cam face 152 formed on an axially inward facing end wall of the sleeve portion 40. The cam ring 148 has a smooth face 154 slidably engaging the smooth axially inward facing end wall of the sleeve 50.

The cam face 150 of the cam ring 148 is in operative engagement with the cam face 152 of the sleeve portion 40, and the cam ring is adjustably rotatable to cause a camming action between the cam faces. This applies an adjustable and oppositely directed outward axial force on the piston sleeve 36 and the sleeve 50 for selective relative axial movement thereof. Such axial preloading eliminates backlash in the inner and outer channels in the manner described above.

The cam ring 148 is provided with outward projections 132, as are provided on the collar 64 of the second embodiment shown in FIG. 3. A threaded aperture 156 in the body sidewall 14 receives a sealing threaded plug 158 to allow access to the cam ring with a tool for its rotational adjustment, as described above for the collar 64 in FIG. 3. The cam ring 148 is selectively locked against rotation relative to the sleeve 50 during usage of the actuator 10 by a pin such as the pin 134 shown in FIG. 8 for the collar 64.

It will be appreciated that, although specific embodiments of the invention have been described herein for purposes of illustration, various modification may be made without departing from the scope of the invention. Accordingly, the invention is not limited except by the appended claims.

I claim:

1. A fluid-powered actuator, comprising:
   a body;
   a rotatable member supported for rotation relative to said body and connectable to an external device;
   a first member reciprocally mounted within said body;
   a second member reciprocally mounted within said body generally coaxial with said first member, said first and second members being independently and adjustably rotatable and axially movable within at least a limited range relative to the other without directly producing axial or rotational movement of the other;
   at least one piston reciprocally mounted within said body for application of fluid pressure to one or the other opposing sides thereof to produce axial movement of said piston, said piston operatively engaging at least one or the other of said first and second members to axially move said members in response to axial movement of said piston;
   first torque-transmitting means for transmitting torque between said first member and said body;
   second torque-transmitting means for transmitting torque between said first member and said rotatable member;
   third torque-transmitting means for transmitting torque between said second member and said rotatable member;
   fourth torque-transmitting means for transmitting torque between said second member and said body, at least said first and fourth torque-transmitting means or said second and third torque-transmitting means producing relative rotational movement between said body and said rotatable member in response to axial movement of said piston, and said first, second, third and fourth torque-transmitting means producing movement of said first and second members in unison and in the same axial direction with substantially equal axial travel in response to axial movement of said piston during fluid powered operation; and
   a collar threadably connected to said first member and applying an adjustable and oppositely directed axial force on said first and second members to selectively axially move at least one of said first or second members relative to the other while allowing at least one of said first or second members to move axially and rotationally independent of the other in response thereto within said limited range by an amount sufficient to axially preload said first and second members with respect to said first, second, third and fourth torque-transmitting means with a desired force, said collar operatively engaging said first and second members to maintain said first and second members in fixed axial position relative to each other during fluid powered operation once so adjusted for preloading to substantially eliminate backlash in said first, second, third and fourth torque-transmitting means as said piston moves from one axial direction to the other to produce relative rotational movement between said body and said rotatable member in response to selective application of fluid pressure to said piston.

2. The actuator of claim 1 further including at least one engagement member axially extending between and engaging each of said collar and said second member to apply said axial force on said first and second members as said collar is adjusted.

3. The actuator of claim 2 wherein said collar is coaxially threaded to an axially outward end portion of said first member.

4. The actuator of claim 2 wherein said engagement member is a pusher pin positioned to apply an axially outward force on each of said first and second members for separation thereof in the axial direction in response to rotational adjustment of said collar relative to said first member to move said collar toward said second member.

5. The actuator of claim 4 wherein said collar is coaxially threaded to an axially outward end portion of said first member and said pin is slidably disposed in a groove in said first member axially extending between said collar and an end portion of said first member adjacent to said second member.

6. The actuator of claim 4 further including a pair of axially extending and substantially straight grooves, one of said grooves being in the outward side of said first member and the other of said grooves being in the inward side of said body, said grooves confronting and corresponding to each other and being sized to slidably receive said pin therein.

7. The actuator of claim 6 wherein said first and fourth torque-transmitting means include a plurality of substantially straight pairs of confronting and corresponding ball races forming sets of races between said first member and body, and between said second member and body with at least one ball seated in each of said ball races for transmitting torque between said body and said first or second member upon axial movement of said piston, said pin groove in said body being positioned between two adjacent ball races in said body forming part of said first torque-transmitting means and being radially positioned no further outward than said adjacent body ball races.

8. The actuator of claim 2 further including a bearing member positioned between said first and second members, said engagement pin slidably engaging said bearing member and applying an axially outward force on said second member through said bearing member.

9. The actuator of claim 1 wherein said piston is positioned axially outward of and fixedly attached to said second member for axial movement thereof.

10. The actuator of claim 1 further including means for selectively locking said collar against rotation relative to said first member during usage of the actuator.

11. The actuator of claim 1 wherein said collar is coaxially threaded to an axially inward end portion of said first member and projects axially inward toward and slidably engages said second member.

12. The actuator of claim 11 wherein said piston is positioned axially outward of and fixedly attached to said first member for axial movement thereof.

13. The actuator of claim 11 wherein said collar is adjustably rotatable to exert an axially outward force on each of said first and second members as said collar is adjustably rotated relative to said first member to move toward said second member.

14. The actuator of claim 11 externally adjustable with a tool, wherein said collar has projections formed on the perimeter thereof for engagement with the tool for adjustable rotation of said collar, and said body has a sealable adjustment port located for access to said collar projections with the tool for rotational adjustment of said collar.

15. The actuator of claim 14 further including a generally axially oriented lock member retained against rotation relative to one of said first or second members and selectively positionable between adjacent projections of said collar to lock said collar against rotation relative to said first and second members during usage of the actuator.

16. The actuator of claim 11 wherein said first and fourth torque-transmitting means include a plurality of substantially straight pairs of confronting and corresponding ball races forming a first set of races between said first member and body, and a second set of races between said second member and body with at least one ball seated in each of said ball races for transmitting torque between said body and said first and second members upon axial movement of said piston, the actuator further including means for engaging and limiting travel of balls between said first and second sets of races.

17. A fluid-powered actuator, comprising:
a body;
a rotatable member supported for rotation relative to said body and connectable to an external device;
a first member reciprocally mounted within said body;
a second member reciprocally mounted within said body generally coaxial with said first member, said first and second members being independently and adjustably rotatable and axially movable within at least a limited range relative to the other without directly producing axial or rotational movement of the other, said second member having an axially inward cam face;
at least one piston reciprocally mounted within said body for application of fluid pressure to one or the other opposing sides thereof to produce axial movement of said piston, said piston operatively engaging at least one or the other of said first and second members to axially move said members in response to axial movement of said piston;
first torque-transmitting means for transmitting torque between said first member and said body;
second torque-transmitting means for transmitting torque between said first member and said rotatable member;
third torque-transmitting means for transmitting torque between said second member and said rotatable member;
fourth torque-transmitting means for transmitting torque between said second member and said body, at least said first and fourth torque-transmitting means or said second and third torque-transmitting means producing relative rotational movement between said body and said rotatable member in response to axial movement of said piston, and said first, second, third and fourth torque-transmitting means producing movement of said first and second members in unison and in the same axial direction with substantially equal axial travel in response to axial movement of said piston during fluid powered operation; and
a cam ring positioned within said body generally coaxial with and between said first and second members, said cam ring having a cam face confronting and corresponding to and operatively engaging said cam face of said second member and an opposite face slidably engaging said first member, said cam ring being rotatable to cause a camming action with said cam face of said second member to thereby apply an adjustable and oppositely directed outward axial force on said first and second members for selective relative axial movement of said first and second members relative to the other while allowing at least one of said first or second members to move axially and rotationally independent of the other in response thereto within said limited range by an amount sufficient to axially preload said first and second members with respect to said first, second, third and fourth torque-transmitting means with a desired force, said cam ring operatively engaging said first and second members to maintain said first and second members in fixed axial position relative to each other during fluid powered operation once so adjusted for preloading to substantially eliminate backlash in said first, second, third and fourth torque-transmitting means as said piston moves from one axial direction to the other to produce relative rotational movement between said body and said rotatable member in response to selective application of fluid pressure to said piston; and
lock means to selectively lock said cam ring against rotation relative to said second member during usage of the actuator.

18. The actuator of claim 17 externally adjustable with a tool, wherein said cam ring has projections formed on the perimeter thereof for engagement with the tool for adjustable rotation of said cam ring.

19. A fluid-powered actuator, comprising:
a body;
an axially extending rotatable shaft positioned within said body and supported for rotation relative to said body;
a first sleeve mounted within said body about said shaft for axially directed reciprocal movement;
a second sleeve generally coaxial with said first sleeve and mounted within said body about said shaft for axially directed reciprocal movement, said first and second sleeves being independently and adjustably rotatable and axially movable within at least a limited range relative to the other without directly producing axial or rotational movement of the other;

an annular piston reciprocally mounted within said body about said shaft for application of fluid pressure to one or the other opposing sides thereof to produce reciprocal axial movement of said piston, said piston being fixedly attached to one or the other of said first or second sleeves to axially move said sleeves in response to axial movement of said piston;

first torque-transmitting means for transmitting torque between said first sleeve and said body;

second torque-transmitting means for transmitting torque between said first sleeve and said shaft;

third torque-transmitting means for transmitting torque between said second sleeve and said shaft;

fourth torque-transmitting means for transmitting torque between said second sleeve and said body, at least said first and fourth torque-transmitting means or said second and third torque-transmitting means producing relative rotational movement between said body and said shaft in response to axial movement of said piston, and said first, second, third and fourth torque-transmitting means producing movement of said first and second sleeves in unison and in the same axial direction with substantially equal axial travel in response to axial movement of said piston during fluid powered operation;

an adjustment collar mounted generally coaxial with and threadably attached to an axially outward end portion of said first sleeve; and a plurality of generally axially oriented pins extending between and operatively engaging each of said collar and said second sleeve, said pins being axially movable in response to rotational adjustment of said collar relative to said first sleeve to provide a selectable and oppositely directed axial force on said first and second sleeves for selective relative axial movement of at least one of said first or second sleeves relative to the other while allowing at least one of said first or second sleeves to move axially and rotationally independent of the other in response thereto within said limited range by an amount sufficient to axially preload said first and second sleeves with respect to said first, second, third and fourth torque-transmitting means with a desired force, said collar operatively engaging said first and second sleeves in fixed axial position relative to each other during fluid powered operation once so adjusted for preloading to substantially eliminate backlash as said piston moves from one axial direction to the other to produce relative rotational movement between said body and said shaft in response to selective application of fluid pressure to said piston.

20. The actuator of claim 19 wherein said pins are pusher pins to apply an axially outward force of each of said first and second sleeves for axial separation thereof.

21. The actuator of claim 20 further including a bearing member positioned between said first and second members, said pin slidably engaging said bearing member and applying an axially outward force on said second member through said bearing member.

22. The actuator of claim 19 further including means for selectively locking said collar against rotation relative to said first member during usage of the actuator.

23. A fluid-powered actuator, comprising:

a body;

an axially extending rotatable shaft positioned within said body and supported for rotation relative to said body;

a first sleeve mounted within said body about said shaft for axially directed reciprocal movement;

a second sleeve generally coaxial with said first sleeve and mounted within said body about said shaft for axially directed reciprocal movement, said first and second sleeves being independently and adjustably rotatable and axially movable within at least a limited range relative to the other without directly producing axial or rotational movement of the other;

an annular piston reciprocally mounted within said body about said shaft for application of fluid pressure to one or the other opposing sides thereof to produce reciprocal axial movement of said piston, said piston being fixedly attached to one or the other of said first or second sleeves to axially move said sleeves in response to axial movement of said piston;

first torque-transmitting means for transmitting torque between said first sleeve and said body;

second torque-transmitting means for transmitting torque between said first sleeve and said shaft;

third torque-transmitting means for transmitting torque between said second sleeve and said shaft;

fourth torque-transmitting means for transmitting torque between said second sleeve and said body, at least said first and fourth torque-transmitting means or said second and third torque-transmitting means producing relative rotational movement between said body and said shaft in response to axial movement of said piston, and said first, second, third and fourth torque-transmitting means producing movement of said first and second sleeves in unison and in the same axial direction with substantially equal axial travel in response to axial movement of said piston during fluid powered operation; and an adjustment collar mounted generally coaxial with and threadably attached to an axially inward end portion of said first sleeve, said collar projecting axially inward toward and slidably engaging said second sleeve, said collar being adjustably axially movable in response to rotational adjustment thereof to provide a selectable and oppositely directed axial force on said first and second sleeves for selective relative axial movement of at least one of said first or second sleeves relative to the other while allowing at least one of said first or second sleeves to move axially and rotationally independent of the other in response thereto within said limited range by an amount sufficient to axially preload said first and second sleeves with respect to said first, second, third and fourth torque-transmitting means with a desired force, said collar operatively engaging said first and second sleeves to maintain said first and second sleeves in fixed axial position relative to each other during fluid powered operation once so adjusted for preloading to substantially eliminate backlash as said piston moves from one axial direction to the other to produce relative moves from one axial direction to the other to produce relative rotational movement between said body and said shaft in response to selective application of fluid pressure to said piston.

24. The actuator of claim 23 externally adjustable with a tool, wherein said collar has projections formed on the perimeter thereof for engagement with the tool for adjustable rotation of said collar, said body having a sealable adjustment port located for access to said collar projections with the tool for rotational adjustment of said collar.

25. The actuator of claim 24 further including a generally axially oriented lock member retained against rotation relative to one of said first or second members and selectively positionable between adjacent projections of said collar to lock said collar against rotation relative to said first and second members during usage of the actuator.

26. A thin profile fluid-powered actuator, comprising:
  a body having a non-cylindrical sidewall with a dimension in a first lateral direction greater than a dimension in a transverse second lateral direction, said sidewall having first and second axially extending interior sidewall portions spaced apart in said first lateral direction, and third and fourth axially extending interior sidewall portions spaced apart in said second lateral direction;
  an axially extending rotatable shaft positioned within said body and supported for rotation relative to said body, said shaft being connectable to an external device;
  a piston sleeve reciprocally mounted within said body about said shaft, said piston sleeve having a head for application of fluid pressure to one or the other opposing sides thereof to produce axial movement of said piston sleeve, said piston sleeve further having a non-cylindrical sleeve with a dimension in said first lateral direction greater than a dimension in said transverse second lateral direction, said sleeve having first and second axially extending exterior sidewall portions spaced apart in said first lateral direction and confronting said first and second body interior sidewall portions, and third and fourth axially extending exterior sidewall portions spaced apart in said second lateral direction and confronting said third and fourth body interior sidewall portions;
  first torque-transmitting means for transmitting torque between said sleeve and said body, said first torque-transmitting means including substantially straight, axially extending grooves formed on said first and second body interior sidewall portions, and substantially straight, axially extending grooves confronting and corresponding thereto formed on said first and second sleeve exterior sidewall portions, said grooves coacting to allow axial movement of said sleeve, but prevent rotational movement thereof, said third and fourth body interior sidewall portions and said confronting and corresponding third and fourth sleeve exterior sidewall portions having no torque-transmitting interconnections;
  second torque-transmitting means for transmitting torque between said sleeve and said shaft, and for producing relative rotational movement between said sleeve and said shaft in response to axial movement of said piston sleeve, whereby high torque relative rotational movement between said body and said shaft is produced in response to selective application of fluid pressure to said piston head with said body having a thin profile in said second lateral direction.

27. The actuator of claim 26 wherein said first and second said body interior sidewall portions comprise an integral part of said body sidewall.

28. The actuator of claim 26 wherein said first and second body interior sidewall portions include a pair of spaced apart inserts positioned within said body and having said body grooves formed on an interior facing side thereof.

29. The actuator of claim 28 further including means for preventing rotation of said inserts within said body during usage of the actuator.

30. The actuator of claim 26 wherein said third and fourth body interior sidewall portions are axially extending smooth interior sidewall portions spaced apart in said second lateral direction, and said third and fourth sleeve exterior sidewall portions are axially extending smooth exterior sidewall portions spaced apart in said second lateral direction confronting and adjacent to said smooth third and fourth body interior sidewall portions, and wherein said first torque-transmitting means sufficiently limits lateral movement of said sleeve in said second lateral direction to hold said smooth sleeve exterior sidewall portions from engaging said smooth body interior sidewall portions during fluid powered operation of the actuator.

31. The actuator of claim 26 wherein said body and sleeve grooves of said first torque-transmitting means comprise ball races positioned in confronting and corresponding relationship to form ball channels, and said first torque-transmitting means further includes one or more balls seated in each of said ball channels.

32. The actuator of claim 26 wherein said second torque-transmitting means includes helical ball races formed on said sleeve and said shaft in confronting and corresponding relationship to form ball channels, and one or more balls seated in each of said ball channels.

33. The actuator of claim 26 further including an independent sleeve reciprocally mounted within said body generally coaxial with said piston sleeve, said piston sleeve and independent sleeve being independently and adjustably rotatable and axially movable within at least a limited range relative to the other without directly producing axial or rotational movement of the other, and adjustment means for selectively and adjustably moving said piston sleeve in an axial direction relative to said independent sleeve within said limited range by an amount sufficient to axially preload said piston sleeve and independent sleeve with respect to said first and second torque-transmitting means with a desired force, and for maintaining said piston sleeve and independent sleeve in fixed axial position relative to each other during fluid powered operation once so adjusted for preloading to substantially eliminate backlash in said first and second torque-transmitting means as said piston moves from one axial direction to the other to produce relative rotational movement between said body and said shaft in response to selective application of fluid pressure to said piston, said first and second torque-transmitting means producing movement of said piston sleeve and independent sleeve in unison and in the same axial direction with substantially equal axial travel in response to axial movement of said piston sleeve during fluid powered operation.

34. The actuator of claim 33 wherein said adjustment means includes an axially adjustable member extending between and engaging each of said piston sleeve and independent sleeve, said adjustable member providing an adjustable and oppositely directed axial force on said piston sleeve and independent sleeve for axially preloading said piston sleeve and independent sleeve.

35. The actuator of claim 33 wherein said adjustment means includes an axially adjustable collar threadably connected to one of said piston sleeve or independent sleeve and operatively engaging the other, and applying an adjustable and oppositely directed axial force therebetween for axial preloading of said piston sleeve and independent sleeve.

36. The actuator of claim 35 wherein said collar is mounted generally coaxial with and threadably attached to an axially inward end portion of said piston sleeve and projects axially inward end portion of said piston sleeve and projects axially inward toward and slidably engages said independent sleeve, said collar being axially movable to apply said axial force in response to rotational adjustment thereof.

37. The actuator of claim 36 externally adjustable with a tool, wherein said collar has projections formed on the perimeter thereof for engagement with the tool for adjustable rotation of said collar, said body having a sealable adjustment port located for access to said collar projections with the tool for rotational adjustment of said collar.

38. The actuator of claim 37 further including a generally axially oriented lock member retained against rotation relative to one of said piston sleeve or said independent sleeve and selectively positionable between adjacent projections of said collar to lock said collar against rotation relative to said piston sleeve and independent sleeve during usage of the actuator.

39. The actuator of claim 35 wherein said collar is mounted generally coaxial with and threadably attached to an axially outward end portion of said independent sleeve, and the actuator further includes at least one engagement member extending between and operatively engaging each of said collar and said piston sleeve, said collar being axially movable to apply said axial force in response to rotational adjustment thereof.

40. The actuator of claim 39 wherein said at least one engagement member includes a plurality of pusher pins circumferentially spaced about said independent sleeve and positioned to apply an axially outward force of each of said piston sleeve and independent sleeve for axial separation thereof.

41. The actuator of claim 40 further including a bearing member positioned between said piston sleeve and independent sleeve, said pins slidably engaging said bearing member and applying an axially outward force on said second member through said bearing member.

42. The actuator of claim 39 further including means for selectively locking said collar against rotation relative to said independent sleeve during usage of the actuator.

43. the actuator of claim 33 wherein said adjustment means includes a cam ring positioned within said body generally coaxial with and between said piston sleeve and independent sleeve, said cam ring having a cam face confronting and corresponding to and operatively engaging an axially inward cam face of one of said piston sleeve or independent sleeve, and having an opposite face slidably engaging an axially inward face of the other of said piston sleeve or independent sleeve, said cam ring being rotatable to cause a camming action with said sleeve cam face to thereby apply an adjustable and oppositely directed outward axial force on said piston sleeve and independent sleeve for axial preloading, the actuator further including lock means for selectively locking said cam ring against rotation relative to said piston sleeve and independent sleeve during usage of the actuator.

44. The actuator of claim 43 externally adjustable with a tool, wherein said cam ring has projections formed on the perimeter thereof for engagement with the tool for adjustable rotation of said cam ring, and said body has a sealable adjustment port located for access to said cam ring projections with the tool for rotational adjustment of said cam ring.

45. The actuator of claim 33 wherein said piston head is non-cylindrical with a dimension in said first lateral direction greater than a dimension in said transverse second lateral direction, whereby the pressurized surface area of said head is increased by extending the head in said first lateral direction to increase the torque output of the actuator without increasing the thickness of the actuator in said second lateral direction.

46. A thin profile fluid-powered actuator, comprising:
a body having a non-cylindrical sidewall with a dimension in a first lateral direction greater than a dimension in a transverse second lateral direction, said sidewall having first and second axially extending interior sidewall portions spaced apart in said first lateral direction, and third and fourth axially extending interior sidewall portions spaced apart in said second lateral direction;
an axially extending rotatable shaft positioned within said body and supported for rotation relative to said body, said shaft being connectable to an external device;
a piston sleeve reciprocally mounted within said body about said shaft, said piston sleeve having a head for application of fluid pressure to one or the other opposing sides thereof to produce axial movement of said piston sleeve, said piston sleeve further having a non-cylindrical sleeve with a dimension in said first lateral direction greater than a dimension in said transverse second lateral direction, said sleeve having first and second axially extending exterior sidewall portions spaced apart in said first lateral direction and confronting said first and second body interior sidewall portions, and third and fourth axially extending exterior sidewall portions spaced apart in said second lateral direction and confronting said third and fourth body interior sidewall portions;
first torque-transmitting means for transmitting torque between said sleeve and said body, said first torque-transmitting means including body sidewall engagement elements formed on said first and second body interior sidewall portions and sleeve sidewall engagement elements confronting and corresponding thereto formed on said first and second sleeve exterior sidewall portions, said body and sleeve sidewall engagement elements coacting to transmit torque, said third and fourth body interior sidewall portions and said confronting and corresponding third and fourth sleeve exterior sidewall portions having no torque-transmitting engagement elements; and second torque-transmitting means for transmitting torque between said sleeve and said shaft, at least said first or second torque-transmitting means producing relative rotational movement between said body and said shaft in response to axial movement of said piston sleeve, whereby high torque relative rotational movement between said body and said shaft is produced in response to selective application of fluid pressure to said piston head with said body having a thin profile in said second lateral direction.

47. The actuator of claim 45 wherein said piston head is non-cylindrical with a dimension in said first lateral direction greater than a dimension in said transverse second lateral direction, whereby the pressurized surface area of said head is increased by extending the head in said first lateral direction to increase the torque output of the actuator without increasing the thickness of the actuator in said second lateral direction.

* * * * *